United States Patent
Kang et al.

(10) Patent No.: US 9,850,387 B2
(45) Date of Patent: Dec. 26, 2017

(54) MICRO-NANO HIERARCHICAL STRUCTURE FOR DRAG REDUCTION AND MICROBIAL ADHESION PREVENTION AND MARINE STRUCTURE COMPRISING THE SAME

(71) Applicant: INDUSTRY-ACADEMIC COOPERATION FOUNDATION YONSEI UNIVERSITY, Seoul (KR)

(72) Inventors: Shinill Kang, Seoul (KR); Eikhyun Cho, Seoul (KR); Myungki Jung, Namayangju-si (KR); Joon Sang Lee, Seoul (KR); Ryung Shin, Geoje-si (KR); Myungyon Kim, Seoul (KR); Changsu Park, Daegu (KR); Taekyung Kim, Busan (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/884,424

(22) Filed: Oct. 15, 2015

(65) Prior Publication Data
US 2016/0152305 A1    Jun. 2, 2016

(30) Foreign Application Priority Data
Nov. 27, 2014   (KR) .................. 10-2014-0167679

(51) Int. Cl.
*B63B 59/04* (2006.01)
*C09D 5/16* (2006.01)

(52) U.S. Cl.
CPC ............ *C09D 5/1681* (2013.01); *B63B 59/04* (2013.01)

(58) Field of Classification Search
None
See application file for complete search history.

(56) References Cited

U.S. PATENT DOCUMENTS

2010/0226943 A1*  9/2010  Brennan ............ A41D 31/0077
                                                   424/400

FOREIGN PATENT DOCUMENTS

| JP | 2509415 B2 | 6/1996 |
|----|------------|--------|
| JP | 2001-114185 A | 4/2001 |
| JP | 2007-261385 A | 10/2007 |

OTHER PUBLICATIONS

KIPO Office Action for Korean Application No. 10-2014-0167679.
Taekyung Kim et al., "Metallic multi-functional nano surfaces with hierarchical structures for drag-reduction and anti biofouling by R2R electrochemical process", IEEE-NMDC 2014, Oct. 15, 2014.

* cited by examiner

*Primary Examiner* — Adam Krupicka
(74) *Attorney, Agent, or Firm* — LRK Patent Law Firm

(57) ABSTRACT

A micro-nano hierarchical structure for drag reduction and microbial adhesion prevention includes a metallic support plate having formed on its surface a plurality of arrays which are each composed of a plurality of metallic micro-structures and which are arranged in parallel, and a plurality of metallic nano-structures uniformly formed on the micro-structures and the support plate.

22 Claims, 8 Drawing Sheets

MICRO-NANO HIERARCHICAL STRUCTURE FOR DRAG REDUCTION AND MICROBIAL ADHESION PREVENTION AND MARINE STRUCTURE COMPRISING THE SAME

CROSS-REFERENCE TO RELATED APPLICATIONS

This application claims priority from Korean Application No. 10-2014-0167679, filed Nov. 27, 2014, the contents of which are incorporated herein by reference in its entirety.

BACKGROUND

1. Field of the Invention

The present invention relates to a micro-nano hierarchical structure for drag reduction and microbial adhesion prevention, which is fabricated to comprise metallic nano-structures present on metallic micro-structures in order to achieve drag reduction and anti-biofouling effects in an environmentally friendly manner, unlike toxic coatings and paints.

2. Description of Related Art

Ships and marine structures are always in contact with many marine organisms. Adhesion of marine organisms is a phenomenon in which unwanted organisms adhere to and grow on the surface of artificial structures submerged in sea water. Marine organisms include microorganisms, plants and animals. When marine organisms adhere to a ship, the roughness of the surface of the ship increases, and thus the frictional resistance of the ship increases, leading to a reduction in the ship speed. To recover this reduction in the ship speed, an increase in fuel consumption is required, leading to an increase in the emission of greenhouse gases. It has been reported that the adhesion of marine organisms causes an increase in fuel consumption of up to 40%. In addition, when the degree of adhesion of calcareous marine organisms was severe, the frictional resistance was estimated to increase to 80%.

In an attempt to prevent the adhesion of marine organisms, a method of coating the submerged portion of a ship with an antifouling paint was proposed. Conventional antifouling paints containing tin compounds have excellent antifouling performance, but since 2003 the use thereof has been restricted by the International Marine Organization (IMO) due to environmental pollution problems such as toxicity to marine organisms.

For this reason, environmentally friendly antifouling paints containing no tin compounds, and low-friction-type antifouling paints allowing marine organisms to be detached using the lubricity of silicone resin upon contact with seawater, are currently used to prevent contamination from being caused by the adhesion of marine organisms, etc. However, antifouling paints containing no tin compound have problems in that they also cause environmental pollution and have poor antifouling performance.

In addition, as environmentally friendly antifouling technology, a method of making a polymer-based functional surface to realize drag reduction and anti-biofouling effects was proposed. However, polymer materials have problems in terms of practical use, because they have poor durability.

BRIEF SUMMARY

The present invention is intended to provide a multifunctional surface comprising micro- and nano-structures and to achieve drag reduction and anti-biofouling effects in an environmentally friendly manner by use of the micro and nano-structures of the surface.

The multifunctional surface comprising micro- and nano-structures according to the present invention is made of a metal material so as to have improved durability, and thus can be applied to the surface of marine structures.

In an embodiment of the present invention, a micro-nano hierarchical structure for drag reduction and microbial adhesion prevention may comprise: a metallic support plate having formed on the surface a plurality of arrays which are each composed of a plurality of metallic micro-structures and which are arranged in parallel; and a plurality of metallic nano-structures uniformly formed on the micro-structures and the support plate.

Preferably, the micro-structures may be in the form of protrusions, each having a long axis and a short axis.

Particularly, the micro-structures may have a width of 10-2000 μm along the cross-section of the long axis, and have a height-to-width ratio greater than 0 but not greater than 5. The shape of the micro-structures may be any one or a combination of two or more selected from the group consisting of a pyramidal shape, a V-groove shape, a U-groove shape and a spherical protrusion shape.

In addition, the plurality of arrays, which are each composed of the plurality of micro-structures, may be spaced from one another at a distance of 5-2000 μm, and the plurality of micro-structures may be arranged such that the long axes of the micro-structures of one array of adjacent arrays cross those of the other array. Furthermore, the width and/or height of the long-axis cross-section of the plurality of micro-structures in each of the arrays may increase and decrease. Preferably, the width and/or height of the long-axis cross-section of the plurality of micro-structures in each of the arrays may increase to a predetermined maximum value, and then decrease to a predetermined minimum value, and then increase again, and this increase and decrease may be repeated.

The nano-structures may be in the form of protrusions having a width of 1-1000 nm and a height-to-width ratio greater than 0 but not greater than 5.

Preferably, the plurality of nanostructures may be spaced from one another at a distance greater than 0 nm but not greater than 1500 nm.

The micro-structures and the nano-structures may be made of the same metal material.

The micro-structures and the nano-structures may be made of either any one single metal selected from the group consisting of nickel, chromium, molybdenum, copper, magnesium and iron, which have corrosion resistance, or an alloy of two or more of these metals, or a metal-based material obtained by adding at least one inorganic material, selected from the group consisting of nitrogen, sulfur, phosphorus and silicon, to one or more of these metals.

In accordance with another embodiment of the present invention, there is provided a movable/fixed type marine structure which is wholly or partially submerged in water, the marine structure comprising the above-described micro-nano hierarchical structure applied to its submerged surface which comes into contact with water.

The micro-nano hierarchical structure for drag reduction and microbial adhesion prevention according to the present invention provides drag reduction and anti-biofouling effects in an environmentally friendly manner by the micro- and nano-structures of the surface.

More specifically, as shown in FIG. 2, the micro-nano hierarchical structure of the present invention allows small vortices to be formed between the micro-structures to thereby reduce shear stress caused by large vortices formed around the micro-structures, thereby providing a drag reduction effect.

In addition, the micro-structures inhibit the inhesion of relatively large organisms such as barnacles, and the nano-structures inhibit the adhesion of small organisms such as microorganisms, indicating that the micro-nano hierarchical structure of the present invention has anti-biofouling effects against various species. Furthermore, the micro-structures increase the velocity of a fluid on the surface to thereby increase the time required for marine organisms to adhere to the surface, thereby further increasing the anti-biofouling effect of the micro-nano hierarchical structure.

The multifunctional surface comprising micro- and nano-structures according to the present invention has improved durability, because it is made of a metal material. Thus, it may be applied to the surface of marine structures.

BRIEF DESCRIPTION OF THE DRAWINGS

FIG. 3A shows micro-structures, and FIG. 3B shows nano-structures at a different magnification.

DESCRIPTION OF SPECIFIC EMBODIMENTS

Reference will be now made in detail to exemplary embodiments of the disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Figure 1:
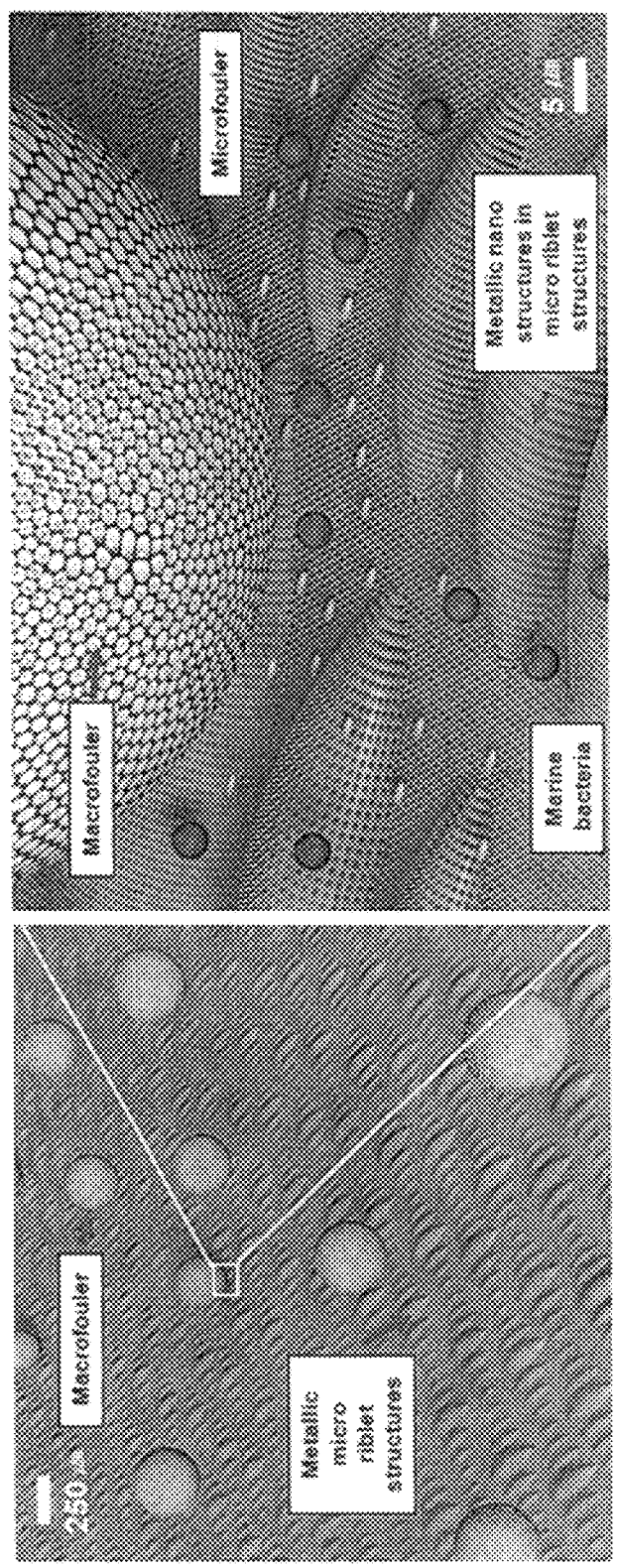
FIG. 1 is a conceptual view showing the mechanism by which microbial adhesion is prevented using a micro-nano hierarchical structure according to an embodiment of the present invention.
Figure 2:
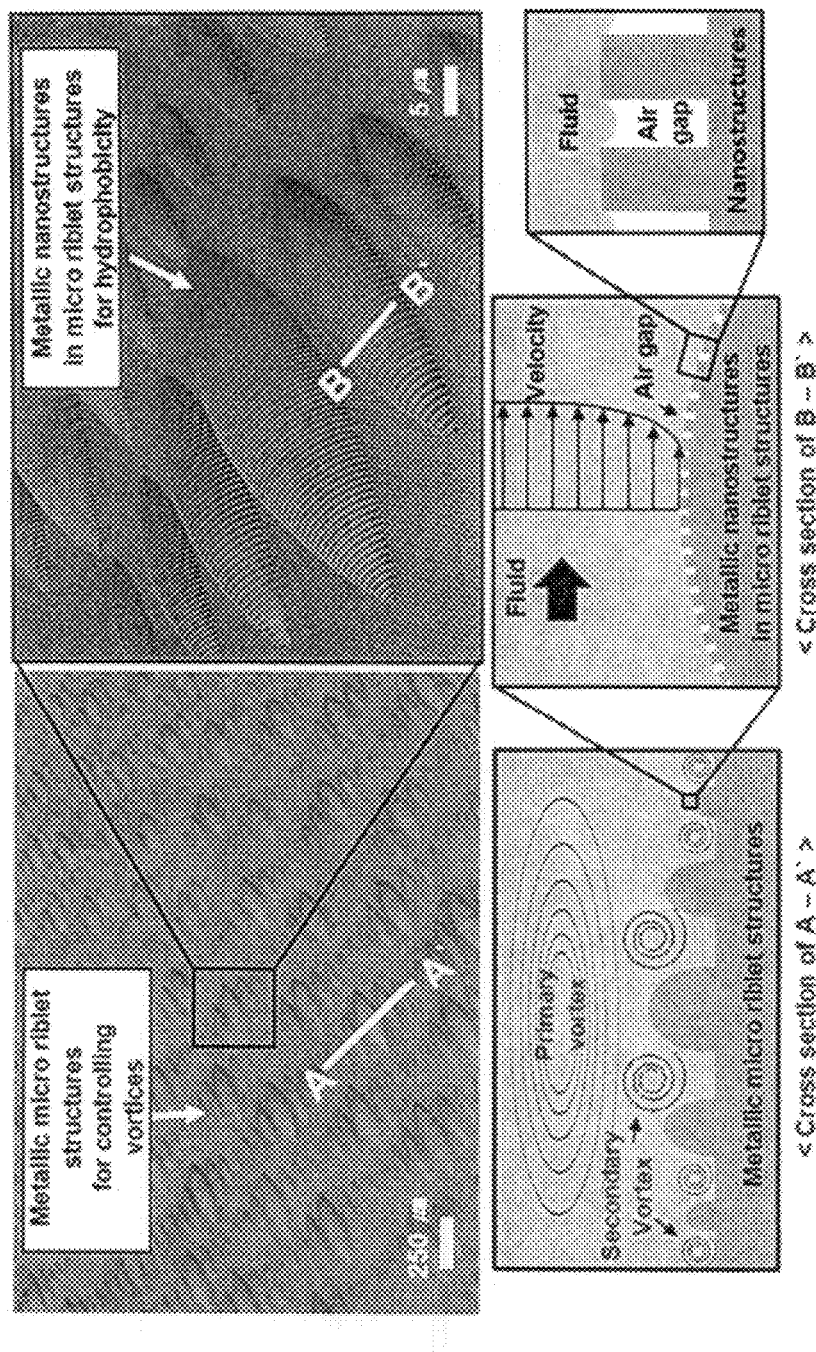
FIG. 2 is a conceptual view showing the mechanism by which drag is reduced using a micro-nano hierarchical structure according to an embodiment of the present invention.

FIGS. 1 and 2 are conceptual views showing a micro-nano hierarchical structure for drag reduction and microbial adhesion prevention according to an embodiment of the present invention. The micro-nano hierarchical structure comprises: a metallic support plate having formed on the surface a plurality of arrays which are each composed of a plurality of metallic micro-structures and which are arranged in parallel; and a plurality of metallic nano-structures uniformly formed on the micro-structures and the support plate.

As shown in FIGS. 1 to 4, the plurality of micro-structures preferably have a protrusion shape having a long axis and a short axis in order to achieve microbial adhesion prevention and drag reduction effects. Furthermore, referring to FIG. 4, the micro-structures are preferably formed to have a width of 10-2000 μm along the long-axis cross-section (AA' cross-section) and to have a height-to-width ratio greater than 0 but not greater than 5. Such structures fabricated as described above can inhibit the adhesion of organisms having a size ranging from several tens to several hundreds of micrometers (μm), and thus can achieve anti-biofouling effects and drag reduction effects.

Figure 4:
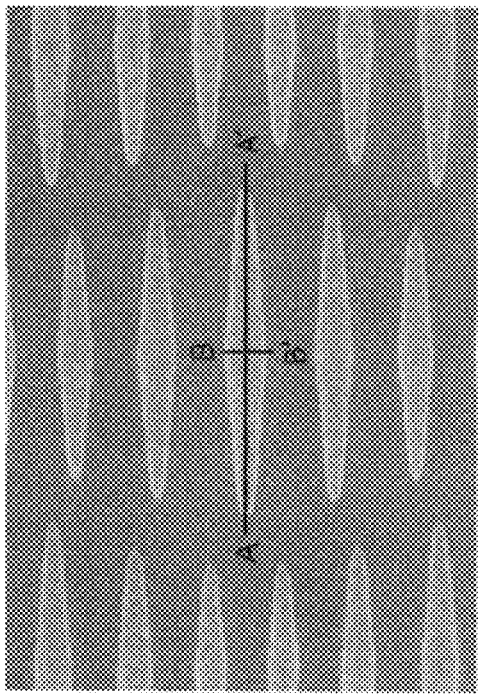
FIG. 4 is a conceptual view showing four examples (pyramidal shape (a), V-groove shape (b), U-groove shape (c) and spherical shape (d)) of the width, height and space along the long-axis (AA') and short-axis (BB') cross-sections of a micro-nano hierarchical structure according to an embodiment of the present invention.
Figure 4:
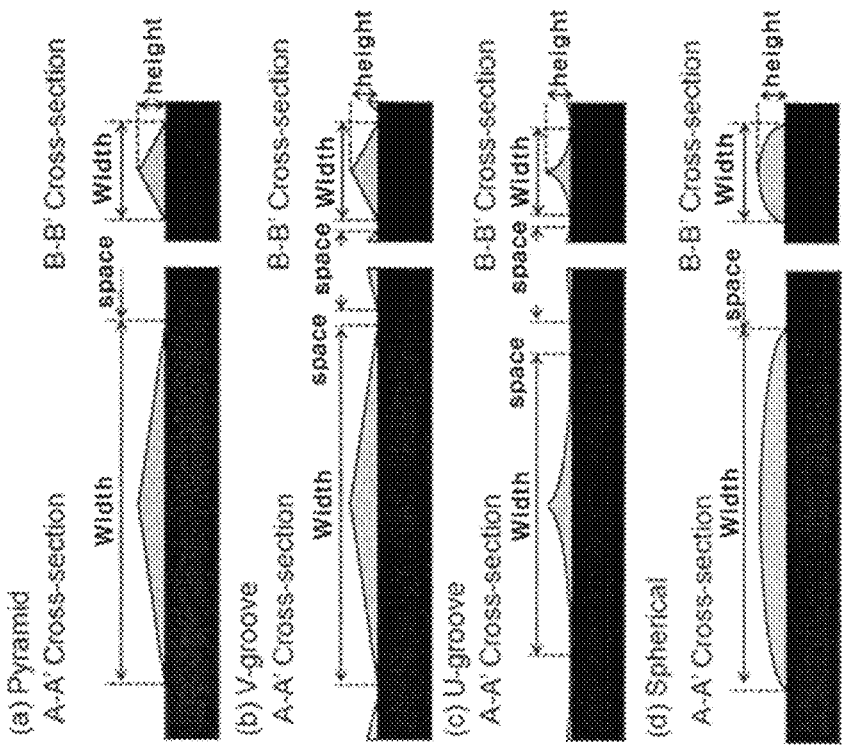

Meanwhile, the micro-structures may have various shapes in order to achieve better drag reduction effects. Preferably, as shown in FIG. 4, the micro-structures may have a pyramidal shape ((a) in FIG. 4), a V-groove shape ((b) in FIG. 4), a U-groove shape ((c) in FIG. 4), a spherical shape ((d) in FIG. 4), or a combination of two or more of these shapes.

In addition, the micro-structures may be spaced from one another at a distance of 5-2000 μm, and can effectively prevent visual organisms having a size of 100 μm or more from adhering to the support plate. Furthermore, the plurality of nano-structures may be spaced from one another at a distance greater than 0 nm but not greater than 1500 nm, and can generally prevent microorganisms having a size of 3-5 μm from adhering to the support plate. In other words, the adhesion of relatively large organisms is inhibited by the micro-structures, and the adhesion of small organisms such as microorganisms is inhibited by the nano-structures. Thus, the micro-nano hierarchical structure for drag reduction and microbial adhesion prevention according to the present invention has anti-biofouling effects against various species.

In addition, the micro-structures and the nano-structures are made of the same metal material so as to have improved durability, and thus can be applied to the surface of marine structures. The metal material that is used for the micro- and nano-structures may be selected from among various metal materials. Preferably, the metal material may be any one single metal selected from the group consisting of nickel, chromium, molybdenum, copper, magnesium and iron, which have corrosion resistance, or an alloy of two or more of these metals, or a material obtained by adding at least one inorganic material, selected from the group consisting of nitrogen, sulfur, phosphorus and silicon, to one or more of these metals. More preferably, the metal material may be one selected from among nickel, a nickel alloy, a copper alloy and a stainless steel alloy.

Figures 3A, 3B:
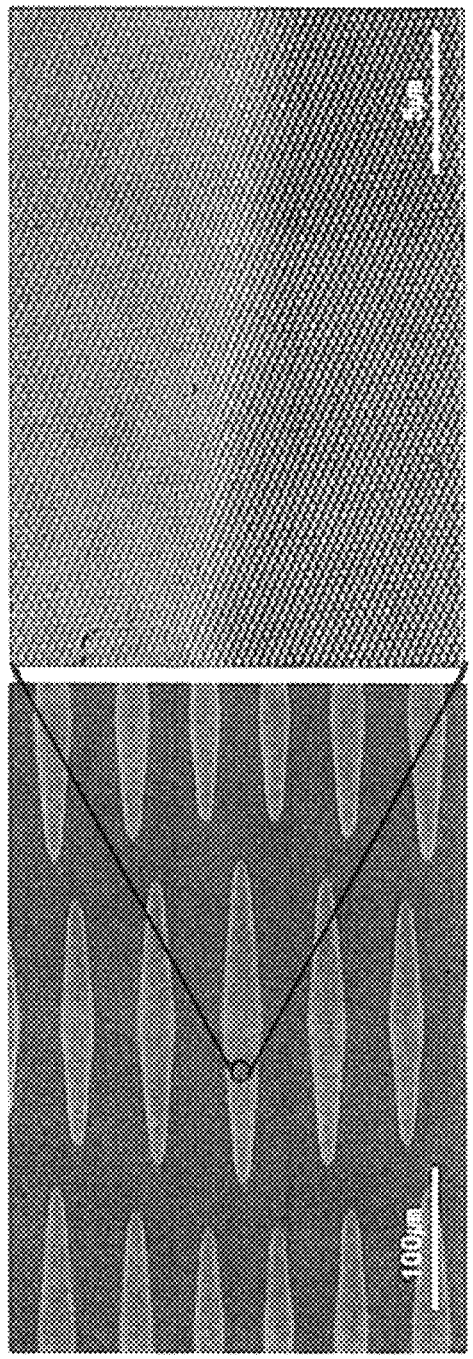
FIGS. 3A and 3B are a set of SEM images showing the surface structure of a micro-nano hierarchical structure according to an embodiment of the present invention. Specifically.

FIGS. 3A and 3B show SEM images of a micro-nano hierarchical structure according to an embodiment of the present invention.

FIG. 3A is an SEM image showing the micro-structures of the micro-nano hierarchical structure of the present invention at the micro-scale. The length or width of the micro-structures can be designed in various ways in order to achieve more efficient drag reduction and anti-biofouling effects, and the micro-structures are not arranged in a simple matrix format, but may be arranged in the following manner. Lines for the micro-structures are spaced at a certain distance from one another, and given lines 1, 2 and 3 in the left-to-right direction, the micro-structures of line 2 may be arranged so as to be visible from the space between the micro-structures of line 1. Likewise, the micro-structures of line 3 may be arranged so as to be visible from the space between the micro-structures of line 3. In other words, a plurality of arrays, each consisting of a plurality of the micro-structures, may be arranged such that the long axes (AA') of the micro-structures in one array of adjacent arrays cross those of the other array.

In addition, as shown in FIGS. 1 to 4, the micro-structures may be arranged such that the height and/or width of the long-axis cross-section of each micro-structure in each array gradually increases to the maximum value, and then gradually decreases. Likewise, the micro-structures may be arranged such that the height and/or width thereof gradually decreases to the minimum value, and then gradually increases, and this pattern can be repeated. When a pattern in which the width of each of the micro-structures in any one line gradually decreases and then increases is formed in any one line, a pattern in which the width of each micro-structure gradually increases and then decreases may be formed in a line adjacent thereto.

FIG. 3B is an SEM image showing the micro-nano hierarchical structure at the nano-scale. As shown therein, a plurality of nano-structures are formed on the micro-structures and the support plate portions having no micro-structures formed thereon. The nano-structures may be formed to have a width ranging from 1 nm to 1 μm and a height-to-width ratio greater than 0 but not greater than 5.

Figures 5A, 5B:
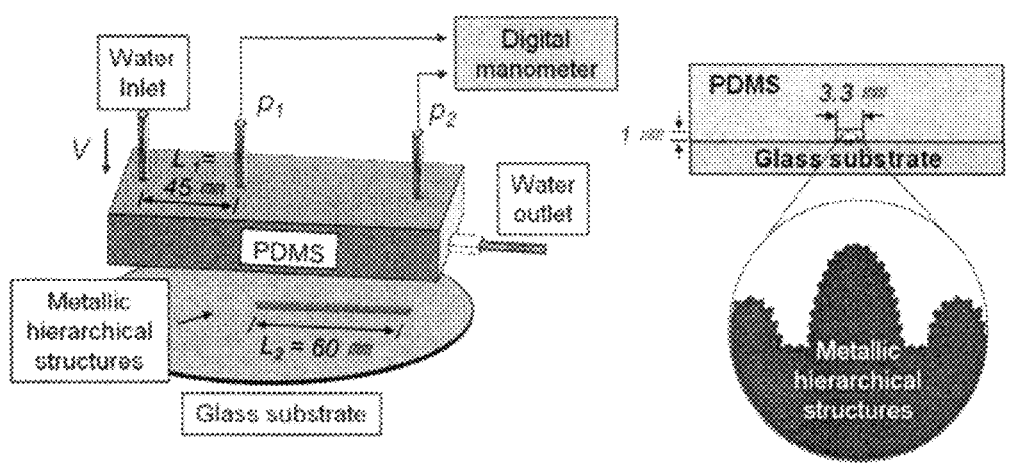
FIGS. 5A and 5B are a conceptual view showing a device for testing the drag of a micro-nano hierarchical structure according to an embodiment of the present invention.

FIGS. 5A and 5B are a conceptual view showing a device for testing the drag of a micro-nano hierarchical structure according to an embodiment of the present invention.

The micro-nano hierarchical structure for drag reduction and microbial adhesion prevention according to the present invention has a drag reduction effect. To test the drag reduction effect of the micro-nano hierarchical structure of the present invention, a test was performed using a drag test device as shown in FIGS. 5A and 5B.

First, a cuboid chamber having a fluid channel inlet at one side and a fluid channel outlet at the other side is provided, and a glass substrate is attached to the bottom surface of the cuboid chamber.

A plain metal surface (bare surface) is attached to the glass substrate, and in this state, the pressure difference between the chamber region of the fluid channel inlet side and the chamber region of the fluid channel outlet side, which occurs when a fluid flows from the fluid channel inlet to the fluid channel outlet, is measured. The pressure difference measured in this way is referred to as $\Delta p_{bare}$.

Meanwhile, the micro-nano hierarchical structure for drag reduction and microbial adhesion prevention is attached to the glass substrate, the pressure difference between the chamber region of the fluid channel inlet side and the chamber region of the fluid channel outlet side, which occurs when a fluid flows from the fluid channel inlet to the fluid channel outlet, is measured. The pressure difference measured in this way is referred to as $\Delta p_{hierarchical}$.

Based on two measured pressure differences, drag reduction ratio is calculated using the following equation:

$$\text{Drag Reduction Ratio}(DR) = \frac{\Delta P_{Bare} - \Delta P_{Hierarchial}}{\Delta P_{Bare}}$$

Figure 6:
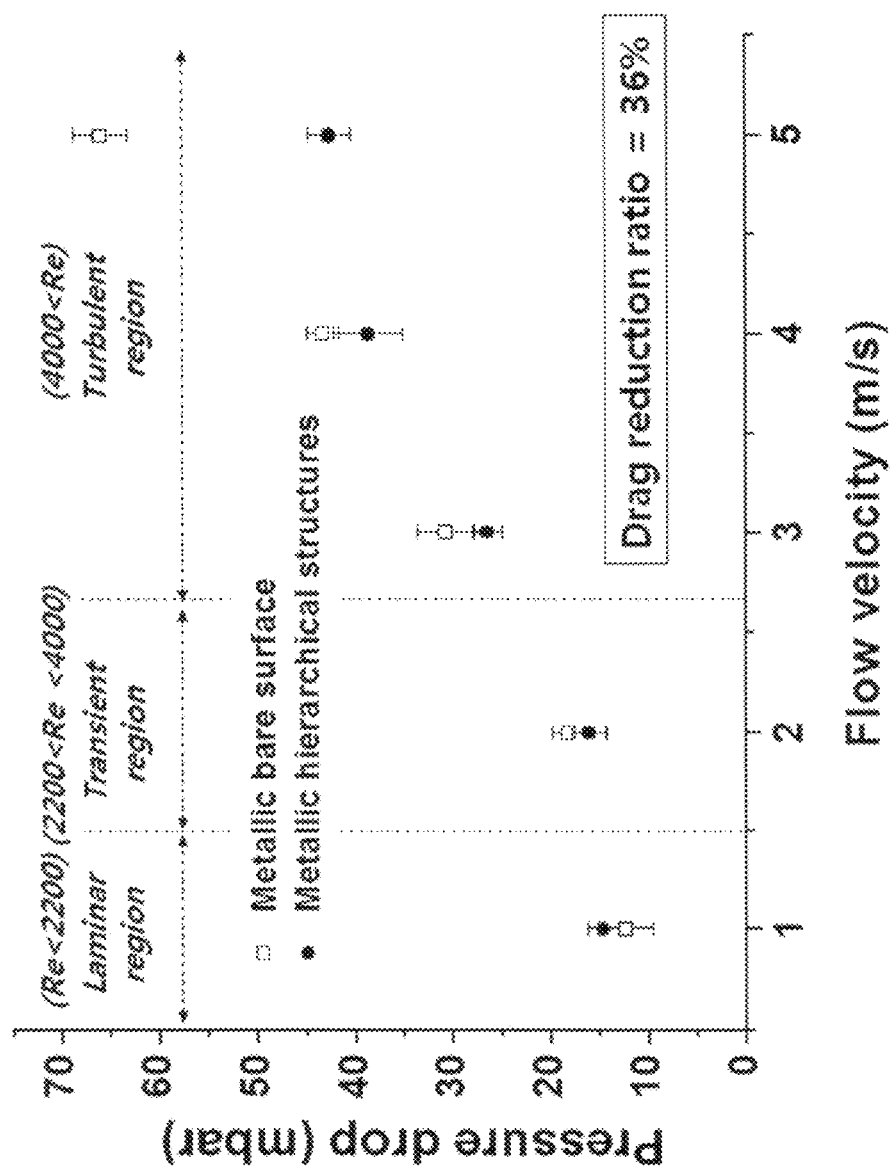
FIG. 6 is a graph showing the results of measuring the drag reduction effect of a micro-nano hierarchical structure according to an embodiment of the present invention.

FIG. 6 is a graph showing the results of measuring the drag reduction effect of a micro-nano hierarchical structure according to an embodiment of the present invention. In the graph of FIG. 6, the x-axis indicates flow velocity (m/s), and the y-axis indicates the measured pressure difference. As shown therein, in a laminar region having a Reynolds number (Re) of 2000 or less and a transient region having a Reynolds number (Re) greater than 2000 but not greater than 3000, there is no great difference between $\Delta p_{hierarchical}$ and $\Delta p_{bare}$. However, when the flow velocity increases to reach a turbulent region having a Reynolds number (Re) greater than 3000, it can be seen that $\Delta p_{hierarchical}$ greatly decreases compared to $\Delta p_{bare}$. At a flow velocity of 5 m/s, a drag reduction ratio of up to 35.5% was measured.

Figure 7A:
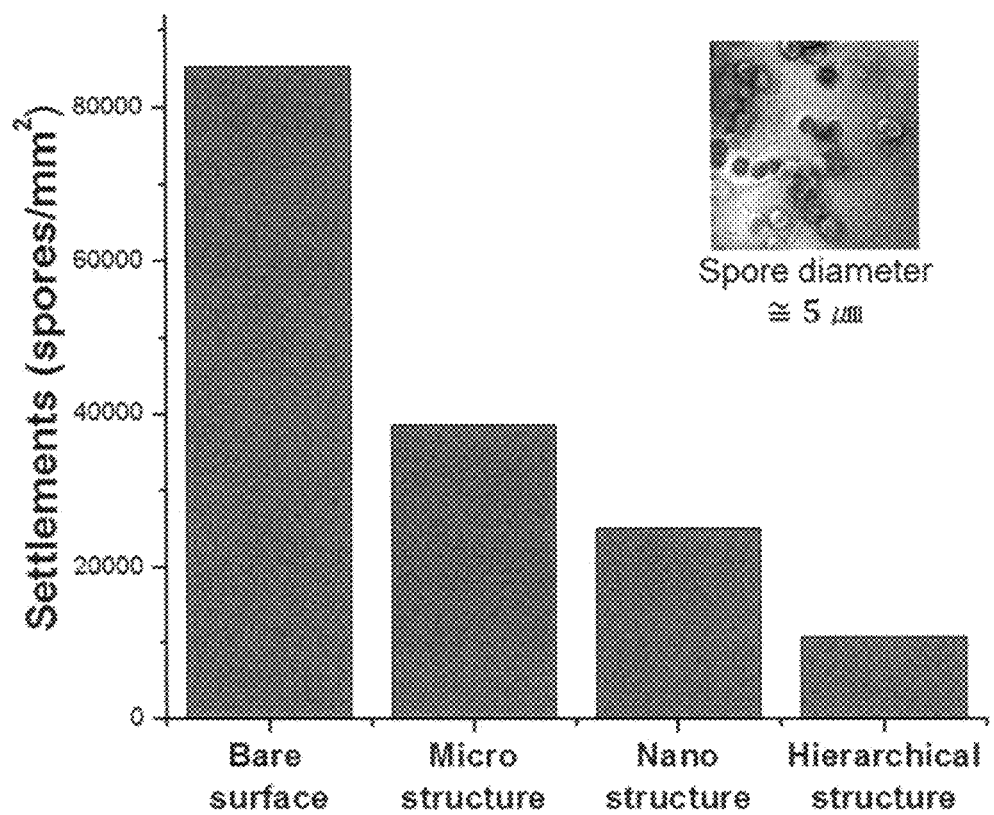
FIGS. 7A and 7B are graphs showing the results of measuring the anti-biofouling effect of a micro-nano hierarchical structure according to an embodiment of the present invention.
Figure 7B:
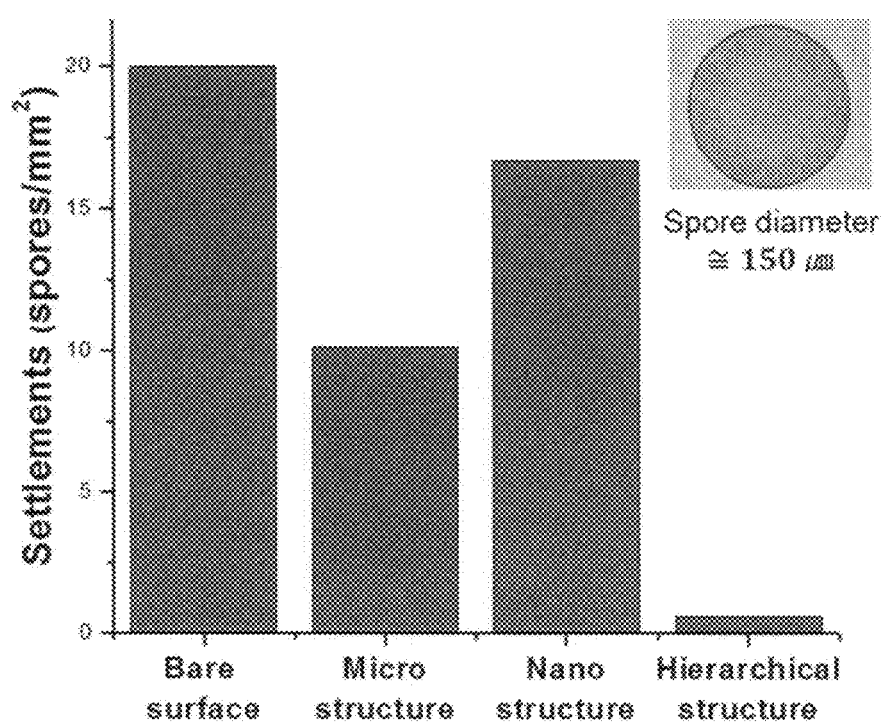

FIGS. 7A and 7B are graphs showing the results of measuring the anti-biofouling effect of a micro-nano hierarchical structure according to an embodiment of the present invention.

FIG. 7A shows the results of measuring the amount of relatively small microorganisms (which are marine microalgae having a diameter of about 5 μm) adsorbed per unit area. As can be seen therein, in the case of a plain metal surface (bare surface), 80,000 or more marine microalgae per unit area were adsorbed, and in the case of a functional metal surface (micro structure) having only micro-structures attached thereto, 40,000 or less marine microalgae per unit area were adsorbed. In the case of a functional metal surface (nano structure) having only nano-structures attached thereto, 30,000 or less marine microalgae per unit area were adsorbed, and in the case of the micro-nano hierarchical structure according to the present invention, about 10,000 marine microalgae per unit area were adsorbed, indicating that the micro-nano hierarchical structure has an excellent anti-biofouling effect.

Meanwhile, FIG. 7B shows the results of measuring the amount of relatively large organisms (which are marine microalgae having a diameter of about 150 μm) adsorbed unit area. As can be seen therein, in the case of a plain metal surface (bare surface), about 20 marine microalgae per unit area were adsorbed, and in the case of a functional metal surface (micro structure) having only micro-structures attached thereto, about 10 marine microalgae per unit area were adsorbed. In the case of a functional metal surface (nano structure) having only nano-structures attached thereto, about 15 or more marine microalgae per unit area were adsorbed, and in the case of the micro-nano hierarchical structure according to the present invention, about 1 marine microalgae per unit area was adsorbed, indicating that the micro-nano hierarchical structure has an excellent anti-biofouling effect.

In summary, the micro-structures inhibit the adhesion of relatively large organisms, and the nano-structures inhibit the adhesion of small organisms such as microorganisms. Thus, the micro-nano hierarchical structure for drag reduction and microbial adhesion prevention according to the present invention has the best anti-antifouling effect. In addition, the micro-structures increase the velocity of a fluid on the surface to thereby increase the time required for marine organisms to adhere to the surface, thereby further increasing the anti-biofouling effect of the micro-nano hierarchical structure.

The micro-nano hierarchical structure according to the present invention as described above can be applied to the surface of marine structures, which comes into contact with seawater. Specifically, the micro-nano hierarchical structure according to the present invention can be applied to the water contact surface of movable, fixed or movable/fixed type marine structures, which are wholly or partially submerged in water, thereby providing the drag reduction effect and anti-biofouling effect as mentioned above.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein.

Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A micro-nano hierarchical structure for drag reduction and microbial adhesion prevention, the micro-nano hierarchical structure comprising:
   a metallic support plate having formed on its surface a plurality of arrays which are each composed of a plurality of metallic micro-structures and which are arranged in parallel; and
   a plurality of metallic nano-structures uniformly formed on a whole single curved surface of the micro-structures and a whole surface of the support plate,
   wherein the micro-structures are in a form of curved protrusions in vertical cross section.

2. The micro-nano hierarchical structure of claim 1, wherein the micro-structures are in the form of protrusions having a long axis and a short axis.

3. The micro-nano hierarchical structure of claim 2, wherein the plurality of micro-structures are arranged such that the long axes of the micro-structures of one array of adjacent arrays cross those of the other array.

4. The micro-nano hierarchical structure of claim 2, wherein a width and/or height of the long-axis cross-section of the plurality of micro-structures in each of the arrays increases and decreases.

5. The micro-nano hierarchical structure of claim 4, wherein the width and/or height of the long-axis cross-section of the plurality of micro-structures in each of the arrays increases to a predetermined maximum value, and then decreases to a predetermined minimum value, and then increases again, and this increase and decrease is repeated.

6. The micro-nano hierarchical structure of claim 2, wherein the micro-structures have a width of 10-2000 μm along a cross-section of the long axis, and have a height-to-width ratio greater than 0 but not greater than 5.

7. The micro-nano hierarchical structure of claim 1, wherein the plurality of arrays, which are each composed of the plurality of micro-structures, are spaced from one another at a distance of 5-2000 μm.

8. The micro-nano hierarchical structure of claim 1, wherein the nano-structures are in the form of protrusions having a width of 1-1000 nm and a height-to-width ratio greater than 0 but not greater than 5.

9. The micro-nano hierarchical structure of claim 1, wherein the plurality of nanostructures are spaced from one another at a distance greater than 0 nm but not greater than 1500 nm.

10. The micro-nano hierarchical structure of claim 1, wherein the micro-structures and the nano-structures are made of the same metal material.

11. The micro-nano hierarchical structure of claim 1, wherein the micro-structures and the nano-structures are made of either any one single metal selected from the group consisting of nickel, chromium, molybdenum, copper, magnesium and iron, which have corrosion resistance, or an alloy of two or more of these metals, or a metal-based material obtained by adding at least one inorganic material, selected from the group consisting of nitrogen, sulfur, phosphorus and silicon, to one or more of these metals.

12. A movable/fixed type marine structure which is wholly or partially submerged in water, the marine structure comprising the micro-nano hierarchical structure of claim 1, applied to its submerged surface which comes into contact with water.

13. A movable/fixed type marine structure which is wholly or partially submerged in water, the marine structure comprising the micro-nano hierarchical structure of claim 2, applied to its submerged surface which comes into contact with water.

14. A movable/fixed type marine structure which is wholly or partially submerged in water, the marine structure comprising the micro-nano hierarchical structure of claim 6, applied to its submerged surface which comes into contact with water.

15. A movable/fixed type marine structure which is wholly or partially submerged in water, the marine structure comprising the micro-nano hierarchical structure of claim 7, applied to its submerged surface which comes into contact with water.

16. A movable/fixed type marine structure which is wholly or partially submerged in water, the marine structure comprising the micro-nano hierarchical structure of claim 3, applied to its submerged surface which comes into contact with water.

17. A movable/fixed type marine structure which is wholly or partially submerged in water, the marine structure comprising the micro-nano hierarchical structure of claim 4, applied to its submerged surface which comes into contact with water.

18. A movable/fixed type marine structure which is wholly or partially submerged in water, the marine structure comprising the micro-nano hierarchical structure of claim 5, applied to its submerged surface which comes into contact with water.

19. A movable/fixed type marine structure which is wholly or partially submerged in water, the marine structure comprising the micro-nano hierarchical structure of claim 8, applied to its submerged surface which comes into contact with water.

20. A movable/fixed type marine structure which is wholly or partially submerged in water, the marine structure comprising the micro-nano hierarchical structure of claim 9, applied to its submerged surface which comes into contact with water.

21. A movable/fixed type marine structure which is wholly or partially submerged in water, the marine structure comprising the micro-nano hierarchical structure of claim 10, applied to its submerged surface which comes into contact with water.

22. A movable/fixed type marine structure which is wholly or partially submerged in water, the marine structure comprising the micro-nano hierarchical structure of claim 11, applied to its submerged surface which comes into contact with water.

* * * * *